(12) United States Patent
Kim et al.

(10) Patent No.: US 10,965,638 B2
(45) Date of Patent: Mar. 30, 2021

(54) COMMUNICATION CHIPSET, COMMUNICATION DEVICE AND PROTOCOL OFFLOAD METHOD FOR AUTOMATIC ADDRESS ALLOCATION

(71) Applicant: WIZnet Co., LTD., Seongnam-si (KR)

(72) Inventors: Woo Youl Kim, Seoul (KR); Hyun Jun Kim, Seoul (KR); Eun Kyoung Kim, Seongnam-si (KR); Bong Jun Hur, Suwon-si (KR); Chan Mi Jeong, Seongnam-si (KR); Deok Hwan Jin, Seoul (KR)

(73) Assignee: WIZnet Co., LTD., Seongnam-si (KR)

( * ) Notice: Subject to any disclaimer, the term of this patent is extended or adjusted under 35 U.S.C. 154(b) by 0 days.

(21) Appl. No.: 16/780,834

(22) Filed: Feb. 3, 2020

(65) Prior Publication Data

US 2020/0267117 A1    Aug. 20, 2020

(30) Foreign Application Priority Data

Feb. 19, 2019 (KR) .................. 10-2019-0019109

(51) Int. Cl.
*H04L 29/12* (2006.01)
*G06F 13/42* (2006.01)
*H04L 12/741* (2013.01)

(52) U.S. Cl.
CPC ...... *H04L 61/2007* (2013.01); *G06F 13/4204* (2013.01); *G06F 13/4282* (2013.01); *H04L 45/74* (2013.01); *G06F 2213/40* (2013.01)

(58) Field of Classification Search
None
See application file for complete search history.

(56) References Cited

U.S. PATENT DOCUMENTS

| 2002/0065806 | A1* | 5/2002 | Kim ..................... H04L 61/2046 |
| 2014/0068093 | A1* | 3/2014 | Ohara .................. H04L 41/082 709/228 |
| 2016/0344755 | A1* | 11/2016 | Hur ....................... H04L 63/164 |
| 2017/0238210 | A1* | 8/2017 | Belghoul .............. H04W 76/27 370/331 |
| 2019/0230729 | A1* | 7/2019 | Barkan ................ H04W 76/11 |

FOREIGN PATENT DOCUMENTS

| KR | 10-2008-0012729 A | 2/2008 |
| KR | 10-137477 B1 | 5/2011 |
| KR | 10-1709874 B1 | 2/2017 |
| KR | 10-2017-0127798 A | 11/2017 |

* cited by examiner

*Primary Examiner* — Joshua Joo
(74) *Attorney, Agent, or Firm* — Revolution IP, PLLC

(57) ABSTRACT

The present invention relates to a communication chipset, a communication device and a protocol offload method for automatic address allocation, and the communication chipset includes: a plurality of registers for storing address setting modes and IP addresses; a controller-interface for setting the address setting mode on the basis of a data received from a controller controlling an offload device through execution of a program; a network-interface for transmitting and receiving a network packet; and an IP address creation control module for automatically setting an IP address of the plurality of registers using the received network packet according to the set address setting mode.

11 Claims, 4 Drawing Sheets

500

COMMUNICATION CHIPSET, COMMUNICATION DEVICE AND PROTOCOL OFFLOAD METHOD FOR AUTOMATIC ADDRESS ALLOCATION

CROSS REFERENCE TO RELATED APPLICATION

The present application claims the benefit of Korean Laid-opened Patent No. KR10-2019-0019109 filed in the Korean Intellectual Property Office on Feb. 19, 2019, the entire contents of which are incorporated herein by reference.

BACKGROUND OF THE INVENTION

Field of the Invention

The present invention relates to a communication chipset, a communication device and a protocol offload method for automatic address allocation, and specifically, to a communication chipset, a communication device and a protocol offload method for automatic address allocation, which can automatically allocate various types of network addresses according to an address setting state analyzed from a packet without analyzing and determining a protocol by software.

Background of the Related Art

Communication devices are connected to various networks and transmit and receive data. For example, the communication devices are connected to Ethernet, Internet or the like and transmit and receive various types of data to and from other devices.

To transmit and receive data through a network, communication devices need to set an address that can be uniquely accessed in the network. The address on the network is not fixed owing to availability of the address and is automatically set in association with an external server.

A generally known automatic address setting method is accomplished using a software stack. A communication device sets various types of IP addresses or the like by processing packets of a network access layer (link layer) through a software stack of the Internet layer, the transport layer and the application layer. The existing communication devices known like this may be allocated with an address of IPv4 or IPv6 by processing Internet layer packets or transport layer packets through software.

Meanwhile, the inventor of the present invention has implemented all network layers under the transport layer as a communication chipset using hardware logic to reduce communication load of a microcomputer or a CPU of a communication device. However, when an address allocation method applicable to IPv6 or the like is used, there is a limit in that the hardware logic of the communication chipset of the inventor cannot be used.

Address allocation according to IPv6 standards requires analysis and process of data in both the Internet layer and the application layer. However, since the TCP/IP hardware logic of the inventor is not easy to apply and bypasses packets of the network access layer to the CPU, the advantage of using the TCP/IP hardware logic is reduced.

Accordingly, it needs to provide a communication chipset, a communication device and a protocol offload method for automatic address allocation, which can automatically allocate an address through hardware logic without analyzing the protocol by software on a protocol including IPv6 or the like.

SUMMARY OF THE INVENTION

Therefore, the present invention has been made in view of the above problems, and it is an object of the present invention to provide a communication chipset, a communication device and a protocol offload method for automatic address allocation, which can automatically allocate various types of network addresses according to an address setting state analyzed from a packet without analyzing and determining a protocol by software mounted on a processor.

In addition, another object of the present invention is to provide a communication chipset, a communication device and a protocol offload method for automatic address allocation, which can automatically allocate an IPv4 or IPv6 address through a hardware logic layer according to various environments outside the communication device.

In addition, another object of the present invention is to provide a communication chipset, a communication device and a protocol offload method for automatic address allocation, which can reduce load of a processor related to address allocation and automatically perform the address allocation, which is essential for operating the application layer, in association with hardware logic of various layers.

The technical problems to be solved by the present invention are not limited to those mentioned above, and unmentioned other technical problems may be clearly understood by those skilled in the art from the following descriptions.

To accomplish the above objects, according to one aspect of the present invention, there is provided a communication chipset included in a communication device capable of data communication with other devices through a network to transmit and receive data to and from a controller of the communication device through a serial bus or a parallel bus, the communication chipset comprising: a plurality of registers for storing address setting modes and IP addresses; a controller-interface for setting address setting modes of the plurality of registers on the basis of data received from the controller controlling the communication device through execution of a program through the serial bus or the parallel bus; a network-interface for transmitting and receiving network packets through the network; an Internet-layer processing module for processing IP packets configured from the network packets through provided hardware logic; an IP address creation control module provided with a state machine configured as hardware logic to automatically set the IP addresses of the plurality of registers through state transition that is different for each set address setting mode using the received network packets; and a first address configuration offload module for receiving an ICMP packet from the Internet-layer processing module and configuring an IP address according to a message type of the ICMP packet through the provided hardware logic, as address configuration is enabled by the IP address creation control module, wherein when the set address setting mode is an automatic-search address mode or a stateless address autoconfiguration mode, the IP address creation control module enables address configuration of the first address configuration offload module so that the IP address can be configured through the ICMP packet.

In addition, according to another aspect of the present invention, there is provided a protocol offload method for automatic address allocation, the method performed in a communication chipset included in a communication device capable of data communication with other devices through a network and connected to a controller of the communication device through a transmission and reception bus, the method comprising the steps of: setting address setting modes of a plurality of registers on the basis of data received from the controller controlling the communication device through a serial bus or a parallel bus, by a controller-interface; automatically setting an IP address using a network packet received through state transition that is different for each set address setting mode, and setting a lifetime-counter of the IP address with a time corresponding to a time stamp determined through the network packet, under the control of an IP address creation control module provided with a state machine configured as hardware logic; and automatically re-setting the set IP address using a network packet received through the network according to a sensing signal created as a time specified according to setting of the lifetime-counter is elapsed, under the control of the IP address creation control module, wherein the setting step includes the steps of: enabling, when the address setting mode set by the controller through the serial bus or the parallel bus is an automatic-search address mode or a stateless address auto-configuration mode, address configuration of a first address configuration offload module so that the IP address can be configured through an ICMP packet, by the IP address creation control module; and receiving the ICMP packet processed by hardware logic for the network packet of the network and configuring the IP address according to a message type of the ICMP packet, as the address configuration is enabled, by the first address configuration offload module provided with the hardware logic.

In addition, a communication device according to another aspect of the present invention comprises: the communication chipset described above; and a controller for controlling the communication chipset to automatically set an IP address by the communication chipset, and transmitting and receiving application data of a layer higher than a transport layer to and from the communication chipset.

The communication chipset, a communication device and a protocol offload method for automatic address allocation according to the present invention as described above has an effect of allocating automatically various types of network addresses according to an address setting state analyzed from a packet without analyzing and determining a protocol by software mounted on a processor.

In addition, The communication chipset, a communication device and a protocol offload method for automatic address allocation according to the present invention as described above has an effect of allocating automatically an IPv4 or IPv6 address through a hardware logic layer according to various environments outside the communication device.

In addition, The communication chipset, a communication device and a protocol offload method for automatic address allocation according to the present invention as described above has an effect of reducing load of a processor related to address allocation and performing automatically the address allocation, which is essential for operating the application layer, in association with hardware logic of various layers.

The effects that can be obtained from the present invention are not limited to the effects mentioned above, and unmentioned other effects will be clearly understood by those skilled in the art from the following description.

DESCRIPTION OF SYMBOLS

Figure 1:
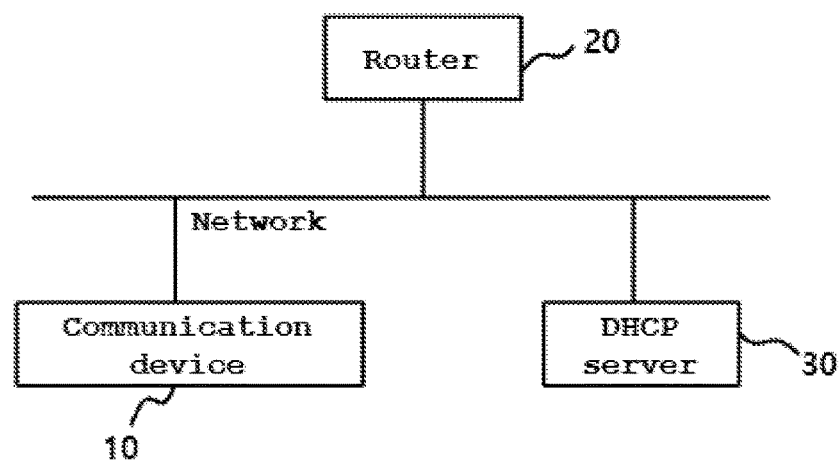
FIG. 1 is a view showing an exemplary system for automatic address allocation.

10: Communication device
100: Input interface
200: Output interface
300: Memory
400: Controller
500: Communication chipset
501: Controller-interface
503: Register
505: Memory buffer
507: IP address creation control module
509: Lifetime-counter
511: Network-interface
513: Data link layer processing module
515: Internet layer processing module
517: First address configuration offload module
519: Transport layer processing module
521: Second address configuration offload module
600: Transmission and reception bus
700: Network port
20: Router
30: DHCP Server

DETAILED DESCRIPTION OF THE PREFERRED EMBODIMENT

The objects, features and advantages described above will be further clarified from the detailed descriptions described below in detail with reference to the accompanying drawings, and accordingly, those skilled in the art may easily embody the spirit of the present invention. In addition, in describing the present invention, when it is determined that specific description of known techniques related to the present invention unnecessarily blurs the gist of the present invention, the detailed description will be omitted. Hereafter, the preferred embodiments according to the present invention will be described in detail with reference to the accompanying drawings.

FIG. 1 is a view showing an exemplary system for automatic address allocation.

Describing FIG. 1 briefly, a communication system accompanied with an automatic address allocation function includes one or more communication devices 10, a router 20 and/or a DHCP server 30 according to the present invention.

The communication device 10 is a device capable of data communication with other devices through a network.

The communication device 10 is configured to automatically set an IPv4 or IPv6 address. Preferably, the communication device 10 may automatically set an IP address (IPv4 or IPv6 address) by a communication chipset 500 which performs communication and perform data communication with other devices through the set IP address.

The communication device 10 will be described in detail with reference to FIG. 2 and the following figures.

The router 20 connects several connected networks. For example, the router 20 may transmit packets received from internal LAN networks to external optical networks according to a destination address or may forward packets from the optical networks to the internal LAN networks according to a destination address. The router 20 may be a gateway or further include a gateway function.

The DHCP server 30 dynamically sets network configuration parameters according to Dynamic Host Configuration Protocol (DHCP) standards. For example, the DHCP server 30 may allocate an IP address, set a lease time, and respond to a host in response to a request from the host (the communication device 10).

The DHCP server 30 may be configured to be separated from the router 20, embedded in the router 20, or included in the router 20 as a function.

The communication device 10 is configured to automatically set its own IPv4 or IPv6 IP address using the router 20 and/or the DHCP server 30.

Figure 2:
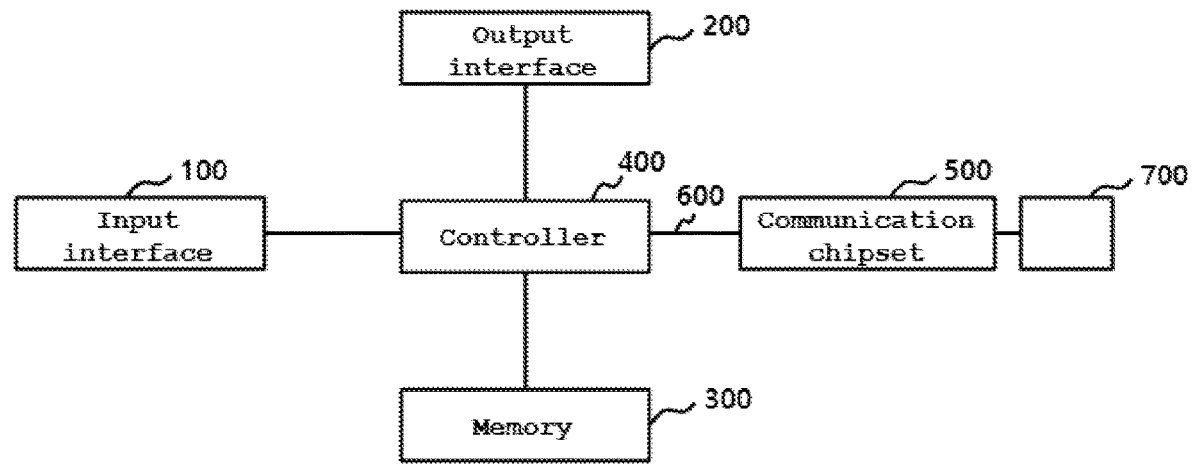
FIG. 2 is a block diagram showing an example of a communication device.

FIG. 2 is a block diagram showing an example of a communication device 10.

According to FIG. 2, the communication device 10 includes an input interface 100, an output interface 200, a memory 300, a controller 400, a communication chipset 500, a transmission and reception bus 600, and a network port 700.

Here, the block diagram of FIG. 2 is an exemplary block diagram of the communication device 10, and some blocks of FIG. 2 may be omitted from the constitutional components, and other blocks not shown in the figure may be further included in the communication device 10. The block diagram of FIG. 2 preferably shows a hardware block diagram.

Describing the communication device 10 through FIG. 2, the input interface 100 receives inputs of a user of the communication device 10. The input interface 100 is provided with a button, a touch panel, a touch pad, a switch, a mouse or the like and may receive various user inputs.

The output interface 200 is provided with an LCD display, an LED display, an optical diode, a buzzer, a speaker or the like and outputs various audio and video signals. The output interface 200 may output audio and/or video signals received from the controller 400.

The memory 300 includes volatile memory and/or non-volatile memory and stores various data. The memory 300 may store program codes performed in the controller 400 and various data used in the program codes.

The controller 400 controls the communication device 10. The controller 400 may load a program code stored in the memory 300 and control the communication device 10 according to the loaded program code. The controller 400 represents or refers to a CPU, an MPU, a central processing unit, a microcomputer or the like, includes one or more execution units for executing the program code, and controls the communication device 10 through execution of commands of the program code by the execution units.

The controller 400 automatically sets an IP address allocated to the communication device 10 by controlling the communication chipset 500. For example, the controller 400 may automatically set an IP address through the router 20 or the DHCP server 30 by setting an address setting mode in the communication chipset 500 or record the IP address stored in the memory 300 into the communication chipset 500. Thereafter, the communication chipset 500 may perform IP-based data communication with other devices using the IP address automatically set or recorded by the controller 400.

The controller 400 according to the present invention is preferably configured not to implement a software stack related to automatic address setting. That is, the controller 400 is configured to automatically and independently set an IP address by the communication chipset 500 according to an external network environment by setting an address setting mode in the communication chipset 500 and enabling address setting, without being provided with a program (software) for processing the Internet layer, the transport layer and the application layer, which is needed to automatically set the IP address.

The controller 400 may transmit and receive packets or data of the application layer to and from the communication chipset 500.

The communication chipset 500 transmits and receives network packets under the control of the controller 400. The communication chipset 500 may automatically set an IP address under the control of the controller 400, configure packets of the transport layer from received network packets using the automatically set IP address, and output data of the transport layer (payload, i.e., application packets) to the controller 400.

The communication chipset 500 receives packets (data) of the application layer from the controller 400, configures the received application packets as network packets, and outputs the network packets to an external network such as a LAN or the like.

The communication chipset 500 according to the present invention is provided with hardware processing modules for processing the transport layer, the Internet layer and the data link layer, respectively. Each of the hardware processing modules is preferably configured to process packets of each layer by using hardware logic and a state machine, without control by an executable program code.

The transmission and reception bus 600 transfers (transmits and receives) data between the controller 400 and the communication chipset 500. The transmission and reception bus 600 may be a serial bus or a parallel bus used inside a board. The transmission and reception bus 600 may be, for example, a serial bus, such as SPI, UART, SDIO or the like, or a parallel bus capable of transmitting and receiving data of two or more bits.

The transmission and reception bus 600 is controlled by the controller 400, and the controller 400 may specify a memory address in the communication chipset 500 for recording or reading data, and record data at a corresponding memory address or read data from the corresponding memory address.

The network port 700 is a port for being connected to a physical medium of a network. The network port 700 may be an Ethernet port, for example, an RJ45 LAN port. The communication chipset 500 may output or recognize wired (or wireless) network signals through the network port 700. The communication chipset 500 may extract data link packets (e.g., MAC packets) from the recognized network signals and perform packet processing.

The communication chipset 500 and its control will be described in more detail with reference to FIG. 3 and the following figures.

Figure 3:
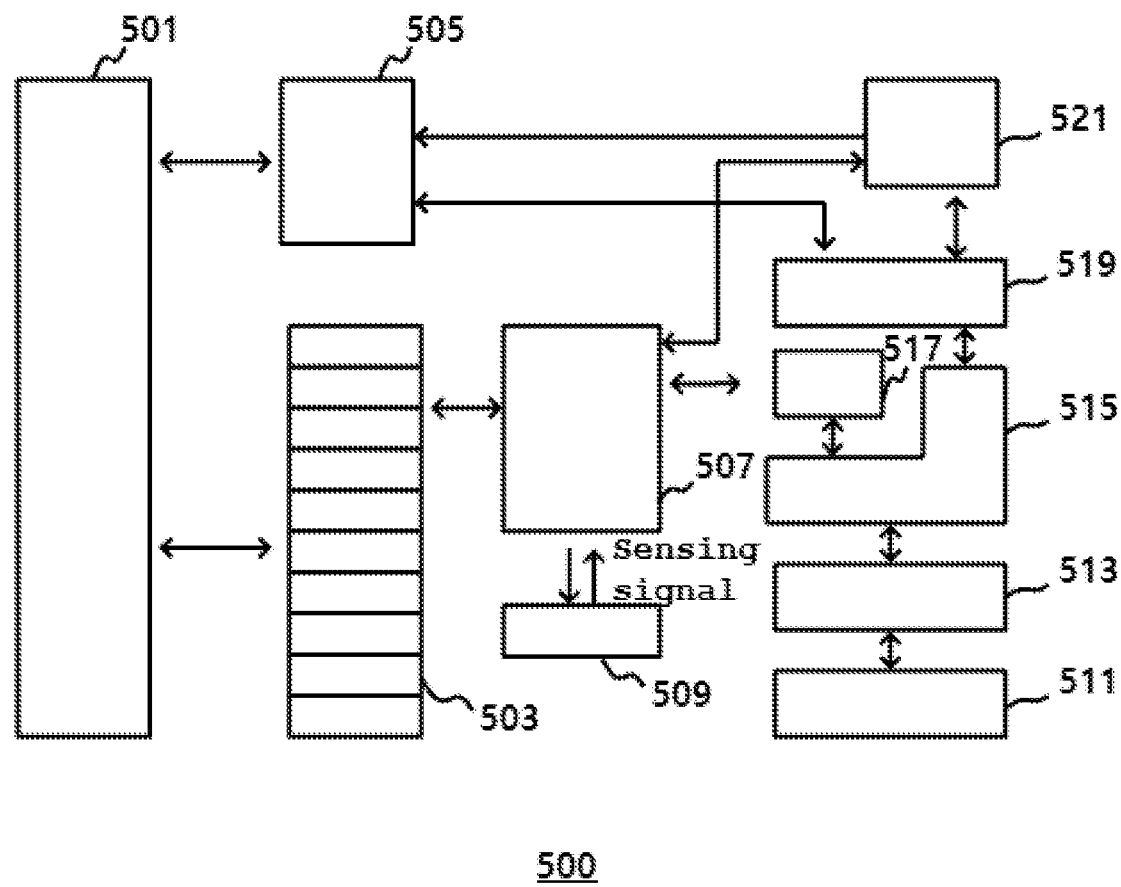
FIG. 3 is a block diagram showing an example of a protocol offload device.

FIG. 3 is a block diagram showing an example of a protocol offload device.

FIG. 3 showing a block diagram of a protocol offload device for automatic address allocation represents a hardware block diagram. The protocol offload device preferably includes or represents the communication chipset 500 controlled by the controller 400.

As is understood from FIG. 3, the protocol offload device includes a controller-interface 501, a plurality of registers 503, a memory buffer 505, an IP address creation control module 507, a lifetime-counter 509, a network-interface 511, a data link layer processing module 513, an Internet-layer processing module 515, a first address configuration offload module 517, a transport-layer processing module 519, and a second address configuration offload module 521.

The protocol offload device of FIG. 3 may be configured as hardware logic configured by synthesizing hardware program codes (documents), such as VHDL, Verilog or the like.

Describing the protocol offload device through FIG. 3, the controller-interface 501 interfaces with the controller 400 and transmits and receives various control and state data. The controller-interface 501 may record the data (control data or application data) received from the controller 400 in the internal registers 503 and/or the memory buffer 505 or output data of the internal registers 503 and/or the memory buffer 505 to the controller 400, under the control of the controller 400.

The controller-interface 501 is connected to the transmission and reception bus 600 of a serial bus, such as SPI, UART, SDIO or the like, or a parallel bus, and may record received data in the register 503 or the memory buffer 505 corresponding to a set (recognized) address through the serial bus or the parallel bus or output data of the register 503 or the memory buffer 505 corresponding to the set (recognized) address to the transmission and reception bus 600.

For example, the controller-interface 501 sets an address setting mode by recording data, which is received through the transmission and reception bus 600 from the controller 400 controlling the protocol offload device through execution of a program, in the register 503.

The plurality of registers 503 stores various control data that will be used to control the protocol offload device and various state data expressing a state of the protocol offload device. Each of the registers 503 may be accessed by the controller 400 through the controller-interface 501. The registers 503 may be configured using flip-flops or the like.

Some registers 503 among the plurality of registers 503 are used for automatic IP address setting according to the present invention. A specific register 503 may be a register for setting an address setting mode, and another specific register 503 may be a register for setting an IP address. A register 503 for storing an IP address may store an IP address of IPv4 and/or IPv6. Another register 503 may be a register for setting a MAC address or the like. The MAC address register 503 may be accessed by the controller 400 and store a MAC address of 48 bits or the like.

The address register 503 of IPv4 and/or IPv6 may be automatically set by the protocol offload device according to the address setting mode, or may be recorded by the controller 400 according to access of the controller 400.

An address setting mode register 503 may set diverse modes for address setting. The address setting mode may be, for example, a fixed mode or an automatic mode. The fixed mode indicates a mode of setting an IP address by the controller 400, and the automatic mode indicates a mode of automatically setting an IP address by the protocol offload device.

The automatic mode may be subdivided into a variety of modes. One of the automatic modes may be a stateless address auto-configuration (stateless no DHCP) mode, another one of the automatic modes may be a stateless-DHCP (stateless with DHCP) mode, another one of the automatic modes may be a stateful-DHCP (stateful with DHCP) mode, and another one of the automatic modes may be an automatic-search address mode. The automatic modes are mutual exclusive, and only one automatic mode may be set as an address setting mode at least at one time point.

The stateless address auto-configuration (stateless no DHCP) mode is a mode of setting an IP address (IPv4 or IPv6) in the Internet layer. The stateless-DHCP (stateless with DHCP) mode and the stateful-DHCP (stateful with DHCP) mode are modes of setting an IP address (IPv6) in the application layer. The automatic-search address mode sets an IP address (IPv4 or IPv6) through the router 20 or the DHCP server 30 by controlling a state machine for automatically setting an IP address according to a communication packet received under various network environments.

The address setting mode register 503 is configured to identify an address mode among a fixed mode, an automatic mode, and furthermore subdivided automatic modes, and the IP address creation control module 507 may create an IP address by controlling an internal state machine for creating an IP address according to the identified address mode.

The memory buffer 505 stores data of the application layer, which is an upper layer of the transport-layer. The memory buffer 505 is configured of volatile memory or the like, divided into a reception buffer and a transmission buffer, and may store various application data.

The reception buffer stores data (application layer data) of a network packet received through the network port 700, the processing of which from the data link layer to the transport layer has been completed. The controller 400 may read data stored in the reception buffer through the controller-interface 501 and process the data in the application layer.

The transmission buffer stores data of the application layer recorded by the controller 400. Packet processing from the transport layer to the data link layer is performed on the data stored in the transmission buffer, and the data is outputted in the form of a processed network packet through the network port 700.

The IP address creation control module 507 automatically creates an IP address using a network packet (transmitted or) received through the network port 700 and sets the created IP address in the register 503. The IP address creation control module 507 is configured to create an IP address according to the address setting mode set in the register 503.

When the address setting mode is set to the automatic mode, the IP address creation control module 507 automatically creates an IP address by controlling the address configuration offload modules 517 and 521, and stores the IP address in the register 503. The IP address creation control module 507 is provided with a state machine and creates an IP address specialized for each automatic mode through state transition that is different for each automatic mode.

The IP address creation control module 507 may control the address configuration offload modules 517 and 521. The IP address creation control module 507 may control to enable the address configuration offload modules 517 and 521 or to perform a specific function.

The IP address creation control module 507 may periodically re-set the IP address according to the set automatic mode. For example, the IP address creation control module 507 is triggered whenever a sensing signal of the lifetime-counter 509 is received (recognized), automatically creates an IP address using a network packet transmitted and received through the network port 700 according to the set automatic mode, and re-sets the created IP address in the register 503.

The IP address creation control module 507 may recognize a time stamp through a network packet in the IP address setting process, and set (initialize) the lifetime-counter 509 using the recognized time stamp. When the address setting mode is set to the fixed mode, the IP address automatic creation function of the IP address creation control module 507 is disabled (deactivated).

The lifetime-counter 509 senses passage of a specified time and outputs a sensing signal, which is an event signal indicating passage of the specified time. The lifetime-counter 509 is a counter counting the lifetime of an automatically set IP address, and the lifetime-counter 509 is set to the received time stamp or the like under the control of the IP address creation control module 507 and outputs a sensing signal indicating passage of a specified time when the specified time is elapsed according to the time stamp.

The network-interface 511 transmits and receives network packets. The network-interface 511 is provided with hardware logic of the physical layer and may extract the network packets by converting physical signals received through the network port 700. In addition, the network-interface 511 may convert network packets received from the data link layer processing module 513 into physical signals and output the physical signals to the network port 700.

The data link layer processing module 513 configures data link packets from the packet signals received through the network-interface 511 and processes the data link packets. For example, the data link layer processing module 513 may configure MAC packets from the packet signals and filter the MAC packets according to comparison of a set MAC address in the register 503 or the type of a MAC packet. When the destination address of the received MAC packet is the same as its own address or the MAC packet is a MAC packet of a broadcast type, the data link layer processing module 513 may transfer the payload (the Internet packet) of the MAC packet to the Internet-layer processing module 515, which is an upper layer.

Here, the data link layer processing module 513 may transfer the payload (the Internet packet) of the MAC packet to a corresponding Internet-layer processing module 515 among several Internet-layer processing modules 515 (it is shown in the figure that there is only one Internet-layer processing module 515 for understanding of the explanation) according to the type of the Internet packet. In this case, the data link layer processing module 513 may configure an Internet packet from a plurality of MAC packets and transfer the configured Internet packet to an Internet-layer processing module 515 for IPv4 or an Internet-layer processing module 515 for IPv6 according to whether the type of the configured Internet packet is IPv4 or IPv6.

In addition, the data link layer processing module 513 may convert the Internet packet received from the Internet-layer processing module 515 into a MAC packet and output the MAC packet through the network-interface 511.

The Internet-layer processing module 515 is connected to the data link layer processing module 513 and the transport-layer processing module 519 and processes Internet (IP) packets. The Internet-layer processing module 515 may process IP packets configured by the data link layer processing module 513 and transmit transport-layer packets to an upper layer or convert transport-layer packets received from the transport-layer processing module 519 into Internet packets and output the Internet packets to the data link layer processing module 513.

The Internet-layer processing module 515 may determine whether the Internet packet is a packet used for determining an address, and when the Internet packet is a packet used for determining an address, the Internet-layer processing module 515 may transmit (payload of) the Internet packet to the first address configuration offload modules 517.

For example, the Internet-layer processing module 515 determines whether the Internet packet is an Internet Control Message Protocol (ICMP) packet used for determining an address through the payload of the Internet packet, and when the Internet packet is an ICMP packet, the Internet-layer processing module 515 transmits the ICMP packet to the first address configuration offload modules 517.

The first address configuration offload module 517 receives a packet (e.g., an ICMP packet) for setting (configuring) an address from the Internet-layer processing module 515, and configures an IP address under the control of the IP address creation control module 507. The address setting function of the first address configuration offload module 517 is enabled or disabled under the control of the IP address creation control module 507.

The transport-layer processing module 519 processes transport-layer packets. The transport-layer processing module 519 configures data of the application layer recorded in the transmission buffer as a transport-layer packet, and outputs the transport-layer packet to the Internet-layer processing module 515. The transport-layer processing module 519 may extract payload from the transport-layer packet received from the Internet-layer processing module 515 and record the payload in the reception buffer. The transport-layer processing module 519 can process TCP packets or UDP packets.

The transport-layer processing module 519 may determine whether the transport-layer packet received from the Internet-layer processing module 515 is a packet used for determining an address, and when the transport-layer packet is a packet used for determining an address, the transport-layer processing module 519 may transmit (the payload of) the transport-layer packet to the second address configuration offload modules 521.

For example, the transport-layer processing module 519 determines whether the transport-layer packet (UDP packet) is a Dynamic Host Configuration Protocol (DHCP) packet used for determining an address through the payload of the transport-layer packet, and when the transport-layer packet is a DHCP packet, the transport-layer processing module 519 transmits the DHCP packet to the second address configuration offload modules 521.

The second address configuration offload module 521 receives a packet (e.g., a DHCP packet) for setting (configuring) an address from the transport-layer processing module 519, and configures an IP address under the control of the IP address creation control module 507. The address setting function of the second address configuration offload module 521 is enabled or disabled under the control of the IP address creation control module 507.

The second address configuration offload module 521 may configure and furthermore set an IPv6 address through the DHCP server 30 by using various data of the DHCP packet. In the process of configuring an IP address, the second address configuration offload module 521 may record option data that cannot be processed as it is not implemented as hardware logic, among DHCP options, so that the controller 400 may process the option data thereafter.

As the option data or the application data is recorded in the reception buffer, the protocol offload device outputs an interrupt signal to the controller 400, and the controller 400 may access the memory buffer 505 or the register 503 through the transmission and reception bus 600 and read various data or perform a function corresponding to the interrupt.

Figure 4:
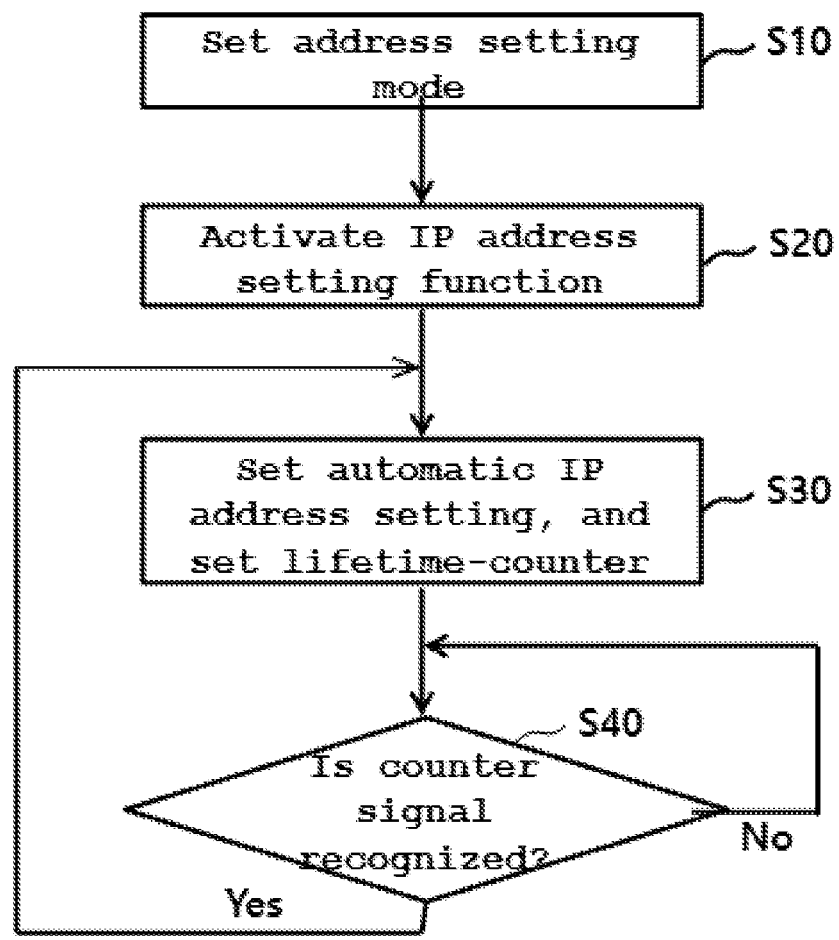
FIG. 4 a flowchart schematically illustrating an automatic address allocation method.

FIG. 4 is a flowchart schematically illustrating an automatic address allocation method.

FIG. 4 shows an automatic address allocation method performed in a protocol offload device (the communication chipset 500) configured as hardware logic.

First, the protocol offload device sets an IP address setting mode (step S10).

Specifically, the controller 400 transfers a MAC address and a data indicating an address setting mode to the protocol offload device through the transmission and reception bus 600, and the controller-interface 501 records the received data (MAC address) in the MAC address register 503, and records the received data (address setting mode) in the address setting mode register 503. Like this, the controller-interface 501 sets an address setting mode under the control of the controller 400.

The set address setting mode indicates a fixed mode or an automatic mode. The automatic mode may indicate a stateless address auto-configuration mode, a stateless-DHCP mode, a stateful-DHCP mode, or an automatic-search address mode. The address setting mode may be set to one mode among several settable modes and allows to automatically create and set an IP address according to the set address setting mode.

The protocol offload device activates the IP address creation function according to the set address setting mode (step S20). For example, when the set address setting mode is automatic mode, hardware logic linked to the address setting mode may enable (activate) the IP address creation control module 507. When the set address setting mode is fixed mode, the hardware logic linked to the address setting mode may disable (deactivate) the IP address creation control module 507.

Preferably, a command register 503 or an IP address creation enable register 503 (or bit) is provided in the register 503, and when the controller 400 records an activation command or an activation flag in a corresponding register, a signal for enabling the IP address creation control module 507 can be created.

The protocol offload device (IP address creation control module 507) is provided with a state machine for controlling the first address configuration offload module 517 and/or the second address configuration offload module 521 in a predetermined sequence according to the set address setting mode, automatically sets an IP address by driving the state machine according to an enable signal, and sets a lifetime-counter for re-setting the set IP address (step S30).

The IP address creation control module 507 automatically sets an IP address using a network packet (transmitted and) received through the network-interface 511 and stores the IP address in the register 503. The IP address creation control module 507 determines a time stamp indicating the lifetime of the IP address automatically set through the (transmitted and) received network packet, and sets a time corresponding to the determined time stamp in the lifetime-counter.

Setting the IP address and the lifetime-counter will be described in more detail with reference to FIG. 5.

The lifetime-counter counts a set time and outputs a counter sensing signal when the set time arrives.

When the counter sensing signal is recognized (step S40), the protocol offload device (IP address creation control module 507) automatically re-sets the IP address using the network packet (transmitted and) received through the network-interface 511, stores the IP address in the register 503, and re-sets a time corresponding to the redetermined time stamp in the lifetime-counter.

Figure 5:
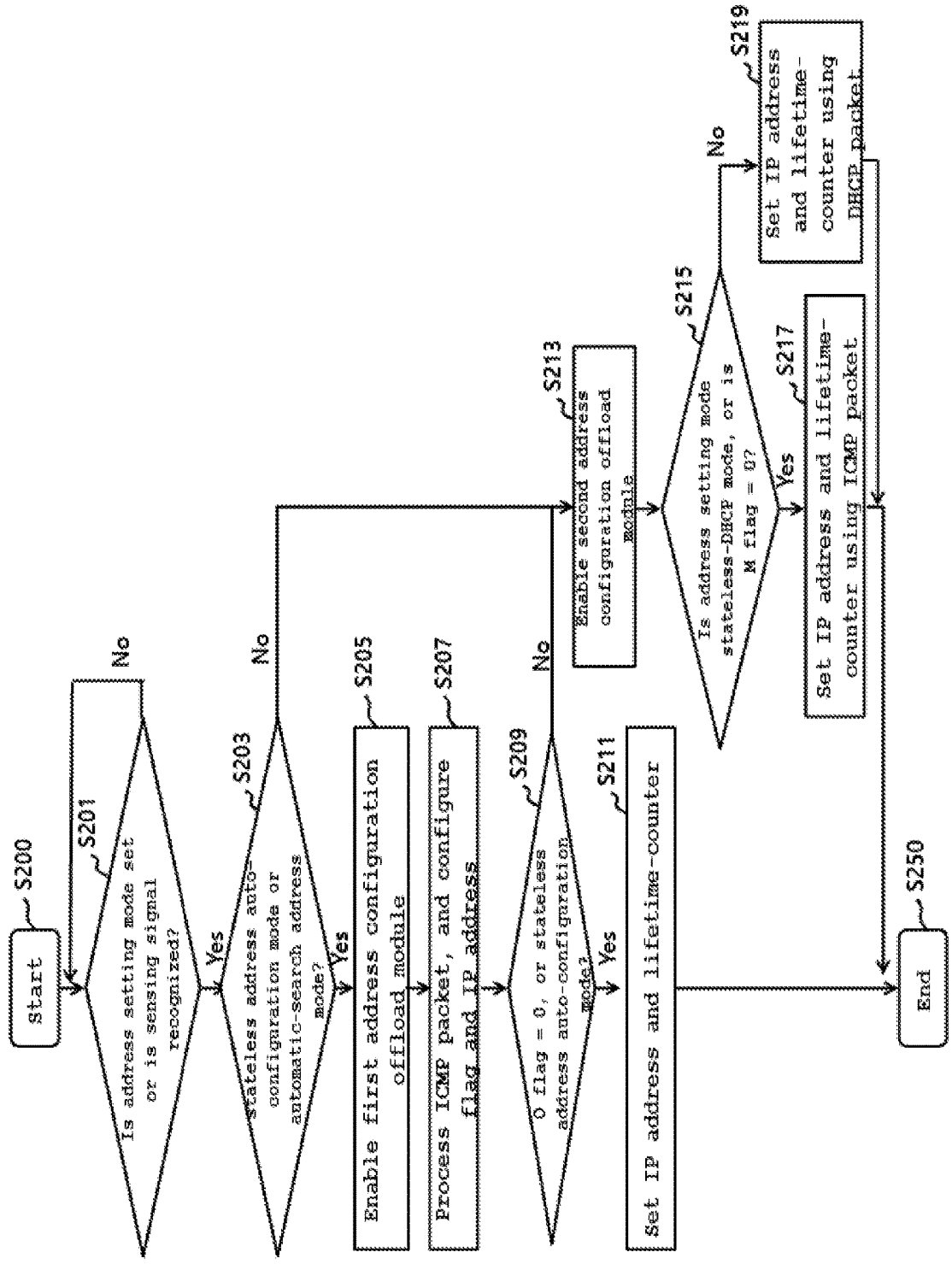
FIG. 5 is a flowchart illustrating a specific control flow of setting an IP address and a lifetime-counter.

FIG. 5 is a flowchart illustrating a specific control flow of setting an IP address and a lifetime-counter.

The control flow of FIG. 5 is performed by the protocol offload device, which is the communication chipset 500, and preferably performed by the IP address creation control module 507 configured as a state machine. The control flow of FIG. 5 preferably shows the specific control of step S30 of FIG. 4.

When an address setting mode is set in the register 503 or a sensing signal is recognized from the lifetime-counter 509 after the address setting mode is set (step S201), the IP address creation control module 507 is triggered (activated) and automatically (re-)sets the IP address thereafter according to the set address setting mode.

First, the IP address creation control module 507 determines whether the set address setting mode is a stateless address auto-configuration mode or an automatic-search address mode (step S203).

When the set address setting mode is a stateless address auto-configuration mode (stateless-DHCP mode) or an automatic-search address mode, the IP address creation control module 507 enables the first address configuration offload module 517 (step S205). At least the address configuration function of the first address configuration offload module 517 may be enabled according to an enable signal received from the IP address creation control module 507. The first address configuration offload module 517 may be a module capable of processing ICMP packets, which allows an IP address to be set through the router 20.

As at least the address configuration function is enabled, the first address configuration offload module 517 processes an ICMP packet configured from the network packet received through the network port 700, and configures a flag and an IP address of the ICMP packet (step S207).

Specifically, the data link layer processing module 513 configures a MAC packet from a packet signal, extracts the payload of the configured MAC packet, and transfers the payload to a corresponding Internet-layer processing module 515 according to the type (e.g., IPv4 or IPv6) of the payload.

The Internet-layer processing module 515 corresponding IPv6 or the like determines whether the IP packet received from the data link layer processing module 513 includes an ICMP packet, and transfers the ICMP packet to the first address configuration offload module 517 when the ICMP packet is included in the IP packet.

The first address configuration offload module 517 confirms (determines) whether the type of the received ICMP packet is a router advertisement (RA) message type advertised by the router 20, and configures a flag, an IP address and the like from the message (ICMP packet) when the ICMP packet type is an RA message type.

For example, the first address configuration offload module 517 extracts the M flag and the O flag of the RA message, and configures an IP address and a time stamp using option field data of the RA message. The first address configuration offload module 517 may create an IP address for IPv6 using an option address, prefix information and the like provided by the router 20 and configure a time stamp indicating deadline of the lifetime of the IP address created from the option field data of the RA message.

The activated first address configuration offload module 517 outputs the M flag, the O flag, and the created IP address and time stamp to the registers 503, the IP address creation control module 507 or the like.

For reference, when the first address configuration offload module 517 does not receive an RA message for a predetermined period of time, the IP address creation control module 507 receiving a signal, indicating that an RA message is not recognized, from the first address configuration offload module 517 may enable the second address configuration offload module 521 and further set an IP address or the like using the DHCP packet (step S219).

When the address setting mode is the automatic-search address mode and the O flag indicates logic 0 or the set address setting mode is the stateless address auto-configuration (step S209), the IP address creation control module 507 records (sets) the IP address outputted from the first address configuration offload module 517 in the IP address of a plurality of registers 503, sets the lifetime-counter 509 with the time stamp outputted from the first address configuration offload module 517 (step S211), and terminates the IP address setting process (step S250).

Then, re-setting of the IP address (step S201 and the following steps) is accomplished according to a sensing signal created as a time specified according to setting of the lifetime-counter 509 is elapsed. As the process is terminated, the first address configuration offload module 517 is deactivated (disabled) under the control of the IP address creation control module 507.

When the address setting mode is the automatic-search address mode and the O flag indicates logic 1 or the set address setting mode is not the stateless address auto-configuration, the IP address creation control module 507 temporarily stores the M flag and the IP address outputted from the first address configuration offload module 517 in the internal register 503, memory or the like, and disables (deactivates) the first address configuration offload module 517.

In addition, the IP address creation control module 507 enables the second address configuration offload module 521 (step S213). At least, the IP address creation control module 507 may enable the address configuration function of the second address configuration offload module 521. Like this, the IP address creation control module 507 enables the second address configuration offload module 521 when the set address setting mode is the stateful-DHCP mode or the stateless-DHCP mode or when the set address setting mode is the automatic-search address mode and the O flag is 1.

As the second address configuration offload module 521 is enabled, the second address configuration offload module 521 may acquire an IP address and/or network information through the DHCP server 30 according to the address setting mode.

When the address setting mode is the stateless-DHCP mode or when the address setting mode is the automatic-search address mode and the M flag is logic 0 (step S215), the second address configuration offload module 521 creates a DHCP discovery packet indicating that the M flag is logic 0 (indicating that the network environment setting state is in the stateless DHCP mode), and outputs the created DHCP discovery packet to the network interface through the transport-layer processing module 519, the Internet-layer processing module 515 and the data link layer processing module 513.

The second address configuration offload module 521 receives a response packet for the transmitted DHCP discovery packet through the data link layer processing module 513, the Internet-layer processing module 515 and the transport-layer processing module 519 (process UDP). The second address configuration offload module 521 may configure and output network information such as a time stamp, DNS information and the like from the received response packet.

When the address setting mode is the stateless-DHCP mode or when the address setting mode is the automatic-search address mode and the M flag is logic 0, the IP address creation control module 507 sets the IP address temporarily stored at the step of processing the ICMP packet of step S207 described above as the IP address of the register 503, and sets the lifetime-counter 509 with the time stamp outputted from the second address configuration offload module 521 (step S217).

The IP address creation control module 507 may further set the network environment using the DNS information or the like. After setting, the IP address creation control module 507 may disable the second address configuration offload module 521 and terminate the process (step S250). Then, re-setting of the IP address (step S201 and the following steps) is accomplished according to a sensing signal created as a time specified according to setting of the lifetime-counter 509 is elapsed.

When the address setting mode is the stateful-DHCP mode or the address setting mode is the automatic-search address mode and the M flag is logic 1, the second address configuration offload module 521 creates a DHCP discovery packet indicating that the M flag is logic 1 (indicating that the network environment setting state is the stateful DHCP mode), and outputs the created DHCP discovery packet to the network interface through the transport-layer processing module 519, the Internet-layer processing module 515 and the data link layer processing module 513.

The second address configuration offload module 521 receives a response packet for the transmitted DHCP discovery packet through the data link layer processing module 513, the Internet-layer processing module 515 and the transport-layer processing module 519 (process UDP). The second address configuration offload module 521 may configure network information such as an IP address, a time stamp, DNS information and the like from the received response packet and output the network information.

When the address setting mode is the stateful-DHCP mode or the address setting mode is the automatic-search address mode and the M flag is logic 1, the IP address creation control module 507 sets the IP address configured at the step of processing the DHCP response packet as the IP address of the register 503, and sets the lifetime-counter 509 with the time stamp configured at the step of processing the DHCP response packet (step S219).

When the second address configuration offload module 521 does not receive a DHCP response packet, the second address configuration offload module 521 may transmit a signal indicating that the DHCP response packet is not received to the IP address creation control module 507. When the DHCP response packet is not received, the IP address creation control module 507 informs the controller 400 that the DHCP response packet is not received through an interrupt or the like, and the controller 400 itself may set an IP address or the like in the address register 503.

The IP address creation control module 507 may further set the network environment using the DNS information or the like. After setting, the IP address creation control module 507 may disable the second address configuration offload module 521 and terminate the process (step S250). Then, re-setting of the IP address (step S201 and the following steps) is accomplished according to a sensing signal created as a time specified according to setting of the lifetime-counter 509 is elapsed.

Here, the second address configuration offload module 521 may process the option field of the DHCP packet, such as the received response packet or the like, and record unprocessed option data in the reception buffer of the memory buffer 505. The option data of the reception buffer is transferred to the controller 400, and option processing of the DHCP packet, which is not implemented as hardware logic, may be accomplished in software.

As the protocol offload device (communication chipset 500) like this is provided, various types of IP addresses may be simply set by the controller 400 by implementing separate hardware logic without constructing a software stack of several layers, and an IP address may be automatically, easily and repeatedly re-set according to the lifetime without intervention of the controller 400.

Since those skilled in the art may make various substitutions, modifications and changes without departing from the spirit of the present invention, the present invention as described above is not restricted by the embodiments described above and the accompanying drawings.

What is claimed is:

1. A communication chipset included in a communication device capable of data communication with other devices through a network to transmit and receive data to and from a controller of the communication device through a serial bus or a parallel bus, the communication chipset comprising:
    a plurality of registers for storing address setting modes and IP addresses;
    a controller-interface for setting address setting modes of the plurality of registers on the basis of data received from the controller controlling the communication device through execution of a program through the serial bus or the parallel bus;
    a network-interface for transmitting and receiving network packets through the network;
    an Internet-layer processing module for processing IP packets configured from the network packets through provided hardware logic;
    an IP address creation control module provided with a state machine configured as hardware logic to automatically set the IP addresses of the plurality of registers through state transition that is different for each set address setting mode using the received network packets; and
    a first address configuration offload module for receiving an ICMP packet from the Internet-layer processing module and configuring an IP address according to a message type of the ICMP packet through the provided hardware logic, as address configuration is enabled by the IP address creation control module, wherein
    when the set address setting mode is an automatic-search address mode or a stateless address auto-configuration mode, the IP address creation control module enables address configuration of the first address configuration offload module so that the IP address is configured through the ICMP packet.

2. The chipset according to claim 1, further comprising a lifetime-counter for sensing passage of a time specified according to automatic setting of the IP address, wherein the first address configuration offload module outputs a time stamp, together with the IP address, and the IP address creation control module records the IP address received from the first address configuration offload module in an IP address register of the plurality of registers, sets the lifetime-counter with the time stamp, and automatically re-sets the IP address register of the plurality of registers using a network packet received according to a sensing signal created as the time specified according to setting of the lifetime-counter is elapsed.

3. The chipset according to claim 1, wherein as the address configuration is enabled, when the type of the received ICMP packet is a router advertisement (RA) message type, the first address configuration offload module extracts an M flag and an O flag of a RA message, configures an IP address and a time stamp from an option field of the RA message, and outputs the configured IP address and time stamp and flag signals indicating the M flag and the O flag.

4. The chipset according to claim 3, further comprising a lifetime-counter for sensing passage of a time specified according to setting of an IP address, wherein when the set address setting mode is the automatic-search address mode and the O flag of the flag signals indicates logic 0 or the set address setting mode is a stateless address auto-configuration mode, the IP address creation control module records the IP address outputted from the first address configuration offload module in an IP address register of the plurality of registers, and sets the lifetime-counter with the time stamp outputted from the first address configuration offload module.

5. The chipset according to claim 1, further comprising:
    a transport-layer processing module for processing a transport-layer packet outputted from the Internet-layer processing module through provided hardware logic; and
    a second address configuration offload module for receiving a DHCP packet from the transport-layer processing module and configuring an IP address using the received DHCP packet through the provided hardware logic according to enabling by the IP address creation control module, wherein
    when the set address setting mode is the automatic-search address mode and an O flag signal received from the first address configuration offload module indicates logic 1, the IP address creation control module temporarily stores an M flag and the IP address from the first address configuration offload module, disables the first address configuration offload module, and enables the second address configuration offload module, and as the second address configuration offload module is enabled, the second address configuration offload module creates a DHCP discovery packet corresponding to an M flag signal from the first address configuration offload module and outputs the DHCP discovery packet to a network interface through the transport-layer processing module and the Internet-layer processing module, and configures and outputs network information including an IP address and a time stamp according to a DHCP response packet for the DHCP discovery packet received through the Internet-layer processing module and the transport-layer processing module.

6. The chipset according to claim 5, further comprising a reception buffer for storing data received from the network, wherein the second address configuration offload module stores an option data of the received DHCP response packet in the reception buffer, and the option data stored in the reception buffer is transferred to the controller through the serial bus or the parallel bus so that option processing according to the option data is accomplished by the controller.

7. A protocol offload method for automatic address allocation, the method performed in a communication chipset included in a communication device capable of data communication with other devices through a network and connected to a controller of the communication device through a transmission and reception bus, the method comprising the steps of:

setting address setting modes of a plurality of registers on the basis of data received from the controller controlling the communication device through a serial bus or a parallel bus, by a controller-interface;

automatically setting an IP address using a network packet received through state transition that is different for each set address setting mode, and setting a lifetime-counter of the IP address with a time corresponding to a time stamp determined through the network packet, under the control of an IP address creation control module provided with a state machine configured as hardware logic; and automatically re-setting the IP address using the network packet received through the network according to a sensing signal created as a time specified according to setting of the lifetime-counter is elapsed, under the control of the IP address creation control module, wherein the setting step includes the steps of:

enabling, when the address setting mode set by the controller through the serial bus or the parallel bus is an automatic-search address mode or a stateless address auto-configuration mode, address configuration of a first address configuration offload module so that the IP address is configured through an ICMP packet, by the IP address creation control module; and receiving the ICMP packet processed by hardware logic for the network packet of the network and configuring the IP address according to a message type of the ICMP packet, as the address configuration is enabled, by the first address configuration offload module provided with the hardware logic.

8. The method according to claim 7, wherein the step of configuring the IP address receives the ICMP packet through an Internet-layer processing module provided with hardware logic as the address configuration is enabled, and when the type of the received ICMP packet is a router advertisement (RA) message type, extracts an M flag and an O flag of a RA message, configures an IP address and a time stamp from an option field of the RA message, and outputs the configured IP address and time stamp and flag signals indicating the M flag and the O flag.

9. The method according to claim 8, wherein the setting step further includes the step of: when the set address setting mode is the automatic-search address mode and the O flag of the flag signals indicates logic 0 or the set address setting mode is a stateless address auto-configuration mode, setting the IP address outputted from the first address configuration offload module as an IP address that will be used in the offload device, and setting the lifetime-counter with the time stamp outputted from the first address configuration offload module, by the IP address creation control module.

10. The method according to claim 8, wherein the setting step further includes the steps of:

when the set address setting mode is the automatic-search address mode and an O flag signal received from the first address configuration offload module indicates logic 1, temporarily storing the M flag and the IP address from the first address configuration offload module, disabling the first address configuration offload module, and enabling a second address configuration offload module provided with hardware logic, by the IP address creation control module; and as the second address configuration offload module is enabled, creating a DHCP discovery packet corresponding to an M flag signal received from the first address configuration offload module and outputting the DHCP discovery packet to a network interface through the transport-layer processing module and the Internet-layer processing module, and configuring and outputting network information including an IP address and a time stamp according to a DHCP response packet for the DHCP discovery packet received through the Internet-layer processing module and the transport-layer processing module, by the second address configuration offload module.

11. A communication device comprising:

the communication chipset of claim 1; and a controller for controlling the communication chipset to automatically set an IP address by the communication chipset, and transmitting and receiving application data of a layer higher than a transport layer to and from the communication chipset.

* * * * *